United States Patent [19]

Piazza

[11] Patent Number: 5,481,754

[45] Date of Patent: Jan. 2, 1996

[54] APPARATUS AND METHOD FOR BIOS INTERFACE TO FEATURES IN MULTIPLE ADAPTER CARDS IN ONE OPERATION USING REGISTERS WITH BITS DISTRIBUTED ACROSS THE ADAPTER CARDS

[75] Inventor: William J. Piazza, Boca Raton, Fla.

[73] Assignee: International Business Machines Corporation, Armonk, N.Y.

[21] Appl. No.: 236,239

[22] Filed: May 2, 1994

Related U.S. Application Data

[63] Continuation of Ser. No. 902,414, Jun. 19, 1992, abandoned, which is a continuation of Ser. No. 525,510, May 18, 1990, abandoned.

[51] Int. Cl.⁶ .......................... G06F 13/00; G06F 12/00; G06F 12/02
[52] U.S. Cl. .......................... 395/823; 395/310; 395/162; 364/DIG. 1; 364/239.9; 364/247; 364/247.2
[58] Field of Search .................................... 395/275, 162, 395/823, 824, 310; 358/22; 345/187

[56] References Cited

U.S. PATENT DOCUMENTS

| | | | |
|---|---|---|---|
| 4,373,181 | 2/1983 | Chisholm et al. | 395/275 |
| 4,438,432 | 3/1984 | Hurcum | 340/825.35 |
| 4,704,697 | 11/1987 | Kiremidzian et al. | 340/717 |
| 4,757,441 | 7/1988 | Buckland et al. | 340/717 |
| 4,849,931 | 7/1989 | Ishii et al. | 395/275 |
| 4,958,915 | 9/1990 | Okaka et al. | 350/345 |
| 4,965,559 | 10/1990 | Dye | 340/717 |

OTHER PUBLICATIONS

"IBM Enhanced Graphics Adapter" pp. 1–75 Aug. 2, 1984.

*Primary Examiner*—Thomas C. Lee
*Assistant Examiner*—R. Dinh
*Attorney, Agent, or Firm*—Anthony N. Magistrale; William N. Hogg

[57] ABSTRACT

Control of LCD backlighting, contrast, and video port selection with BIOS. Calls made from application programs to BIOS result in BIOS read and write operations to a distributed register in video adapters. The use of the register allows BIOS to simultaneously obtain information from multiple displays, as well as simultaneously execute hardware functions such as backlight control. In addition, use of BIOS simplifies programming of hardware related tasks such as backlight control to improve mean time between failure (MTBF) of LCD displays.

14 Claims, 2 Drawing Sheets

DIGITS 3, 2, 1, AND 0 REPRESENT THE 4 SECTIONS OF THE MULTIPORT ADAPTER

REGISTER ADDRESS

8200

LCD SENSE    HOST PRESENT

8201

MONITOR    ID

8203/8202

PIGGYBACK CARD ID

8204

VIDEO PORT SELECT

8206/8205

LCD CONTRAST SETTING

8207

BACKLIGHT CONTROL

APPARATUS AND METHOD FOR BIOS INTERFACE TO FEATURES IN MULTIPLE ADAPTER CARDS IN ONE OPERATION USING REGISTERS WITH BITS DISTRIBUTED ACROSS THE ADAPTER CARDS

This is a continuation of application Ser. No. 07/902,414 filed on Jun. 19, 1992, now abandoned which is a continuation of appliction Ser. No. 07/525,510 filed on May 18, 1990, now abandoned.

CROSS-REFERENCE TO RELATED APPLICATIONS

This application is related to the commonly owned copending application entitled "Apparatus and Method for Distributing Registers Across Multiple Adapter Cards" filed May 18, 1990, bearing U.S. Ser. No. 7/525,509 now abandoned and naming Jeffrey D. Harper, Paul W. Kalendra, William J. Piazza, Howard C. Tanner, and Anh Vinh, one of whom is the inventor named herein, the contents of which is specifically incorporated by reference herein in its entirety.

BACKGROUND OF THE INVENTION

1. Technical Field

This invention relates to BIOS interfaces. In particular, a BIOS interface for controlling video features of a system.

2. Background Art

A Liquid Crystal Display (LCD) is a commonly used peripheral (I/O) device on computer systems. Due to the nature of the LCD hardware, it is important to have the contrast and backlight properly adjusted to enable a user to read the LCD display screen comfortably. However, in commercial settings terminals may be unattended for long periods of time. This is disadvantageous because the useful life of the display is a function of backlight use. For example, the mean time between failure (MTBF) of the LCD screen is greater than that of a CRT display, but the MTBF of the backlight is less than that of a CRT display. Therefore, the ability to control usage of the backlight directly effects the relative reliability of an LCD display in relation to a CRT display. In turn, this effects the decision of a purchaser when reliability is an issue. It would be desirable to have a simple way to automatically control the backlight with software to avoid unnecessary wear on the backlight.

In addition, in systems with multiple displays, switching from one display to another involves a complicated software process. Typically a prior art system will have to do the following to switch displays:

1. Save the BIOS interrupt vectors and BIOS data areas of the currently selected video port.

2. Change hardware registers to deselect one port and select another.

3. Restore the interrupt vectors and BIOS data area of the newly selected video port.

In summary, the reliability of LCD terminals is not as good as the hardware will allow. In addition, control of display switching is inefficient. The prior art has not shown the ability to easily and efficiently control LCD hardware displays.

SUMMARY OF THE INVENTION

An object of this invention is to switch between a plurality of video ports within a system through a single BIOS call.

Another object of this invention is to control the LCD backlight of the currently selected video port.

A further object of this invention is to turn off the LCD backlight after a predetermined amount of time.

Yet another object of this invention is to control the LCD contrast voltage of the currently selected video port.

A still further object of this invention is to have the system set a pre-stored default contrast automatically whenever the system is restarted.

An additional object of this invention is to program applications such that they can easily manipulate LCD display hardware functions.

The foregoing and other objects, features and advantages of this invention are achieved by controlling the LCD switching, backlight, and other functions, such as contrast, through a single BIOS call.

DESCRIPTION OF THE PREFERRED EMBODIMENT

For the purposes of this disclosure, the following definitions will be used:

1. BIOS - Basic Input Output Subsystem - a set of assembly language programs residing in EPROM on the system board or option adapter cards. BIOS provides an interface between hardware functions and the operating system and application programs.

2. POST - Power On Self Test - a set of assembly language programs residing in EPROM on the system board or option adapter cards. POST routines execute whenever the system is turned on or restarted and they verify the proper operation of the hardware and initialize devices as required.

3. BIOS Data Area - an area of RAM memory used by BIOS to store the status of various devices which it controls. On IBM PC compatible machines, the BIOS data area consists of the 256 bytes of memory starting at absolute address 400h.

4. Extended BIOS Data Area - an extension to the BIOS Data Area. The Extended BIOS Data Area starts out as the top 1K bytes of memory in IBM PC Compatibles and can be expanded if necessary. A large portion of this data area is dynamically allocated to whatever installed device needs it and is quite frequently unused.

5. NMI - Non Maskable Interrupt - an interrupt which cannot be disabled using the standard methods of masking interrupts (i.e., the CLI instruction or by changing the Interrupt Mask Register in the interrupt controller chip.)

6. BBSRAM - Battery Backed Static RAM - a special area of memory which is nonvolatile because it is kept powered by a battery when the system power supply is off.

By way of general overview, control of LCD backlight and contrast can be accomplished with a single BIOS call. In addition, switching between LCD displays in a system with multiple displays can also be accomplished with a single BIOS call. The advantages of this invention is that the controlling software is more efficient, therefore having better performance. In addition, the functions such as backlight control are easier to implement in software, which results in a greater probability that they will be used to increase LCD display MTBF.

The same backlight and contrast BIOS calls work on all video ports regardless of whether the controlling hardware resides on the system board or a single or multiport video adapter. The backlights can be forced to turn themselves off after a preset time interval (this is important for extending the useful life of the backlights). They can be turned back on and reset to turn off automatically again with a single BIOS call.

Figure 1:
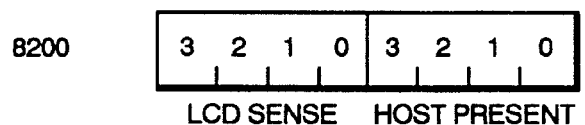
FIG. 1 shows the distributed register format.
Figure 1:
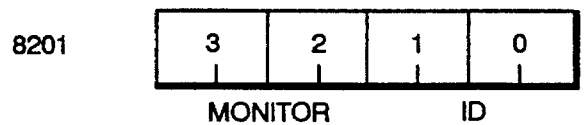
Figure 1:
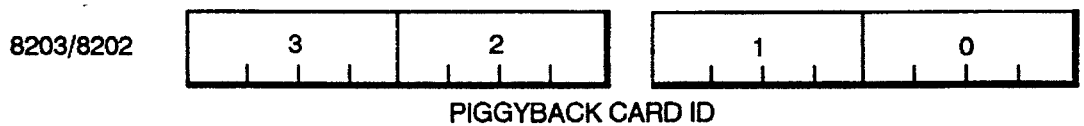
Figure 1:
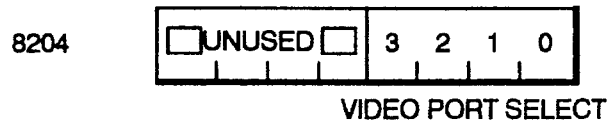
Figure 1:
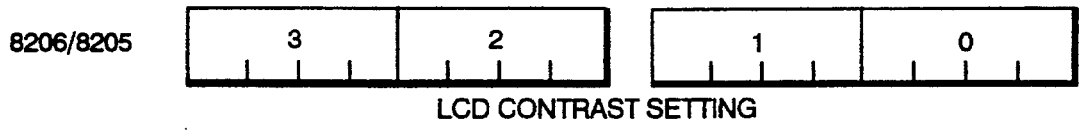
Figure 1:
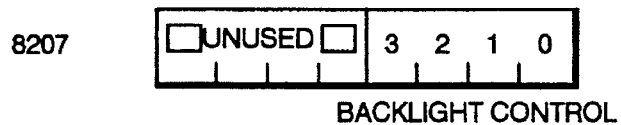
Figure 2:
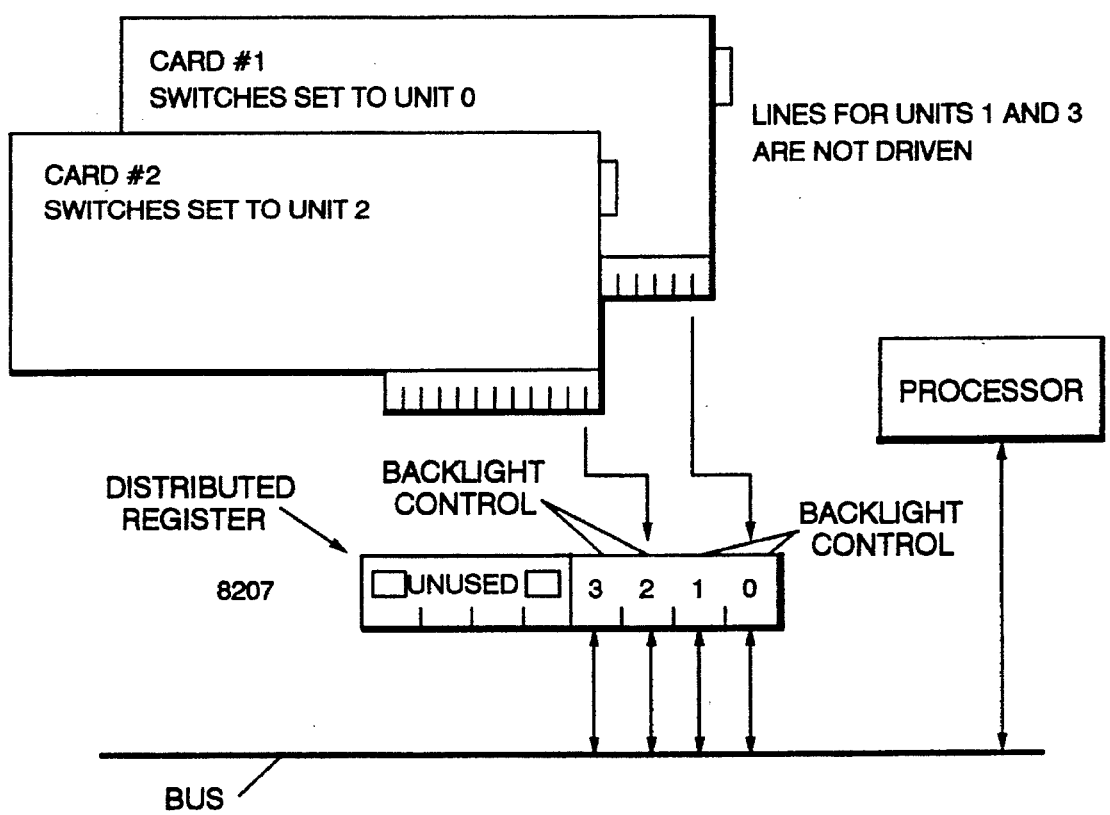
FIG. 2 is a diagram showing the elements of the system in relation to the distributed register.

The distributed register, described in the cross-referenced application, is used by the instant invention. FIG. 1 shows the format of the distributed register as used in the preferred embodiment. FIG. 2 shows the distributed register in relation to the other elements of the system.

The following is an overview of how each of the major functional enhancements to the video subsystem were implemented:

1. Contrast control, backlight control, and display sensing. Contrast and backlight control registers and display sense registers are located at different addresses for the video ports available within the system. BIOS will make a determination as to which video port is currently selected and automatically select the proper registers to use. This simplifies the calling procedure.

2. Backlight "auto-off" function. Application software can specify that the backlights should turn off automatically after a certain period of time so that the life of the backlights will be prolonged by not using it during periods of inactivity. The application can then make calls to the 'backlight on' function of BIOS whenever system activity requiring the backlight is detected. This call will turn the backlight on if it is off and will reset the timeout if the backlight is already on.

The implementation of the 'auto-off' feature is as follows:

(a) A COUNTER and TIMEOUT VALUE are stored in the Extended BIOS Data Area for each of the 5 video ports. If the COUNTER and TIMEOUT VALUE are set to 0, the auto-off feature is not being used.

(b) To start the auto-off feature, an application makes a BIOS call that sets the TIMEOUT VALUE to a non-zero value and performs the 'backlight on' function.

(c) Whenever the 'backlight on' BIOS call is made, BIOS turns the backlight on and copies the TIMEOUT VALUE to the COUNTER.

(d) The COUNTER is decremented by the NMI handler once every 10 milliseconds. When the COUNTER reaches 0, the backlight is turned off.

(e) To stop the auto-off feature, an application makes a BIOS call that sets the TIMEOUT VALUE to 0.

3. Default contrast setting. During power on, POST will retrieve a default contrast setting from the Battery Backed Static RAM (BBSRAM) if BBSRAM has been initialized. If BBSRAM has not been initialized, a value stored in the EPROM is used. A utility program under the "setup" portion of the diagnostics allows the user to set the default value into BBSRAM.

4. Video switching. Video switching begins during POST. Five data areas of slightly less than 64 bytes each are allocated in the Extended BIOS data area. Four data areas are provided for adapter ports and one data area is provided for a video port on the system board. As each video port is tested and initialized, POST saves certain key interrupt vectors and portions of the BIOS data area by copying them into the Extended BIOS Data Area before initializing the next video port. For example, the system board video is enabled and initialized, then the vectors and BIOS data are saved in the Extended BIOS Data Area before moving on to initialize the I/O channel video adapters. Each of the 5 video ports in the system has its own buffer in the Extended BIOS Data Area. Whenever an application program requests switching to a different video port, BIOS takes the following actions automatically:

(a) Interrupt vectors and BIOS Data Area parameters related to video are copied to the Extended BIOS Data Area in a block reserved specifically for the currently selected video port.

(b) Hardware registers are changed to cause the deselection of one port and the selection of another.

(c) Interrupt vectors and BIOS Data Area parameters related to video are copied from the BIOS Data Area (from the block reserved specifically for the newly selected video port).

A specific implementation of the preferred embodiment is shown in the following detailed description of the BIOS functions (the use of BIOS and BIOS functions are well known in the art) used to implement this invention:

The following gives the details of portions of the BIOS interface under INT 15h (System Services) which have been created to access the extensions described in this herein.

```
INT 15H (SYSTEM SERVICES)
AH=OD0H TERMINAL SPECIFIC FEATURES
    AL=03H EXTERNAL CRT SENSE
        ON RETURN:
            AL = STATUS:
                BITS 7-2 = 0
                BITS 1-0 = EXT CRT SENSE BITS
                ECS  BITS
                1    0        MEAN 1    1        LCD (NO EXT CRT)
                1    0        31KHZ COLOR DISPLAY
                0    1        31KHZ MONOCHROME
                              DISPLAY
                0    0        15KHZ COLOR CRT
            NOTE:   THIS CALL ALWAYS WORKS WITH
                    THE CURRENTLY
                    SELECTED VIDEO PORT.
    AL=05H LCD DISPLAY CONTRAST AND BACKLIGHT
CONTROL
        BH=00H  SET OPERATOR DISPLAY CONTRAST
                LEVEL TO BL
                O<= BL <= OF)
                (SETTING BL TO ZERO TURNS THE
                VOLTAGE TO THE IICD PANEL OFF)
        NOTE:   THIS CALL ALWAYS WORKS WITH
                THE CURRENTLY
                SELECTED VIDEO PORT.
        BH=01H  ASSIGN 'CONTRAST UP'
                FUNCTION TO KEY BL
        BH=02H  ASSIGN 'CONTRAST DOWN'
                FUNCTION TO KEY BL (WHEN
                ENABLED, THE CORRESPONDING
                KEY ON THE KEYBOARD
                IS USED TO
                INCREASE OR DECREASE
                THE OPERATOR
                DISPLAY CONTRAST.
                THE KEY MAY NOT
                BE USED FOR ANY OTHER PURPOSE
                AND WILL NOT RESULT IN A SCAN
                CODE BEING PASSED TO
                THE APPLICATION. BOTH
                UP AND DOWN FUNCTIONS
                DO NOT HAVE TO BE
                ASSIGNED SINCE THE KEYS
                CONTRAST VALUES WILL
                'WRAP'. TO DISABLE
```

|  |  |
|---|---|
| | THIS FEATURE, SELECT KEY 00 FOR BOTH FUNCTIONS, WHICH IS THE DEFAULT.) |
| BH=03H | OPERATOR DISPLAY BACKLIGHT |
| NOTE: | THESE CALLS ALWAYS WORK WITH THE CURRENTLY SELECTED VIDEO PORT. |
| BL=00H | BACKLIGHT OFF |
| BL=01H | BACKLIGHT ON |
| BL=02H | BACKLIGHT ON, AUTO-OFF IN CX SECONDS IF CX=0000, AUTO-OFF FUNCTION IS DISABLED AND THE BACKLIGHT WILL REMAIN ON. |
| BL=03H | STATUS ON RETURN: AL=BACKLIGHT STATUS BITS 7-2 = 0 BIT 1 = 1 IF BACKLIGHT IS IN AUTO-OFF MODE (CX WILL RETURN TIMEOUT VALUE IN SECONDS) BIT 0 = 1 IF BACKLIGHT IS CURRENTLY ON |
| NOTES: 1) | WHEN OPERATING IN AUTO-OFF MODE, THE "ON" COMMAND WILL TURN THE DISPLAY ON AND RESTART THE TIMER. THE DISPLAY WILL THEN TURN OFF AGAIN AFTER THE SPECIFIED TIME INTERVAL UNLESS A KEY IS PRESSED ON THE MEMBRANE KEYBOARD. |
| 2) | TO COMPLETELY DISABLE THE AUTO-OFF FUNCTION AND ALLOW SIMPLE CONTROL USING THE ON AND OFF COMMANDS, CALL AUTO OFF (Bl=02H) WITH CX SET TO 0. (THIS TURNS THE DISPLAY ON AND CANCELS AUTO-OFF) THEN USE THE NORMAL OFF CALL. |
| 3 | WHEN IN AUTO-OFF MODE, THE BACKLIGHT WILL TURN ON (IF IT IS OFF) WHEN A KEY IS PRESSED ON THE KEYBOARD AND THE KEYSTROKE WILL BE THROWN AWAY. |
| 4) | ON TOUCHSCREEN UNITS, TOUCHSCREEN ACTIVITY WILL NOT TURN THE BACKLIGHT BACK ON. TOUCHSCREEN DEVICE DRIVERS OR APPLICATION PROGRAMS HANDLING TOUCHSCREENS SHOULD INCLUDE A CALL TO TURN THE BACKLIGHT ON WHENEVER TOUCHSCREEN ACTIVITY IS DETECTED. |
| AL=0AH VIDEO PORT SELECTION | |
| BH=00H SELECT VIDEO PORT | |
| BL=00H PORT 0 (SYSTEM BOARD) | |
| BL=01H PORT 1 (ADAPTER) | |
| BL=02H PORT 2 (ADAPTER) | |
| BL=03H PORT 3 (ADAPTER) | |
| BL=04H PORT 4 (ADAPTER) | |
| ON RETURN: | |
| ZF=1 | MEANS REQUESTED PORT DOES NOT EXIST (THE HARDWARE REGISTERS WILL STILL BE SET TO SELECT THE NON-EXISTENT PORT) |
| ZF=0 | MEANS REQUESTED PORT EXISTS (IF THE MOST SIGNIFICANT BIT OF BL IS SET WHEN THIS CALL IS MADE, THE SPECIFIED VIDEO PORT WILL BE SELECTED AND IT WILL ALSO BE RESET TO BIOS VIDEO MODE 3 USING A BIOS INT 10H AX=0003H CALL.) THIS CALL CHANGES ALLOWS THE SELECTION OF ANY VIDEO PORT (WHETHER IT IS ON THE SYSTEM BOARD OR THE SINGLE OR MULTIPORT VGA CARD) BY PERFORMING THE FOLLOWING FUNCTIONS: |
| 1) | BIOS DATA AREAS AND INTERRUPT VECTORS FOR THE CURRENTLY SELECTED VIDEO PORT ARE SAVED IN THE EXTENDED BIOS DATA AREA (A UNIQUE AREA FOR EACH VIDEO PORT) |
| 2) | HARDWARE REGISTERS ARE CHANGED TO SELECT THE REQUESTED VIDEO PORT |
| 3) | BIOS DATA AREAS AND INTERRUPT VECTORS ASSOCIATED WITH THE NEWLY SELECTED VIDEO PORT ARE RESTORED FROM THE EXTENDED BIOS DATA AREA |
| BH=01H | RESERVED FOR POST/BIOS (SAVE PORT DATA AREA) |
| BH=02H | RESERVED FOR POST/BIOS (RESTORE PORT DATA AREA) |
| BH=03H | QUERY CURRENT VIDEO PORT RETURNS CURRENTLY SELECTED VIDEO PORT NUMBER IN AL (0 TO 4). |
| On return from all AH=0D0H calls: All registers preserved except AX (unless otherwise noted) If AH=86 and CY=1, invalid function or subfunction was given | |

I claim:

1. An apparatus for separately controlling a plurality of separately addressable I/O devices in a system, and wherein each of said I/O devices has functions which are independently controllable with respect to other I/O devices; said apparatus comprising:

a processor;

a system bus, said bus operatively connected to said processor;

a plurality of I/O devices;

at least one adapter, each adapter operatively connected to said bus and to at least one I/O device, each of said adapters further comprising:

switch selection means to indicate to said adapter the address associated with each I/O device connected thereto;

said adapters having a plurality of distributed registers, each associated with a different one of said functions, each one of said distributed registers associated with and distributed among all of said adapters and having a single system address for said distributed register for receiving information in a single BIOS call from a system bus relating to one of the functions of each I/O device, each of said distributed registers being comprised of at least one bit of information from each adapter and said at least one bit of information being operative to control one of said functions of each I/O device associated with said each adapter; and means to use said information in said distributed register to control or communicate selectively with each of said I/O devices from said single system address and control one of the functions of each I/O device independently of other I/O devices from said single operation in said single BIOS call; and BIOS means to transfer information to said register to execute hardware related functions in said system;

said BIOS means including a given address to address all of said I/O devices, and means to provide a call to each I/O device therewith;

means to store in said distributed register said call to each of said I/O devices individually and readable by all of said I/O devices; and whereby a single address serves to address each I/O device individually.

2. An apparatus, as in claim 1, further comprising:
at least one distributed register bit location to store display contrast control information.

3. An apparatus, as in claim 1, further comprising:
at least one distributed register bit location to store display backlight control information.

4. An apparatus, as in claim 1, further comprising:
at least one distributed register bit location to store display status information.

5. An apparatus, as in claim 1, further comprising:
at least one distributed register bit location to store display command information.

6. An apparatus, as in claim 1, further comprising:
at least one distributed register bit location to store display address information.

7. An apparatus, as in claim 6, further comprising:
means to determine when the adapter is the highest priority adapter selected.

8. A method for individually controlling each of a plurality of separately addressable I/O devices in a system and wherein each of said I/O devices has functions which are independently controllable with respect to the other I/O devices having BIOS means, wherein there is at least one adapter with each adapter connected to at least one I/O device in said system; said method including the steps of:

providing a plurality of distributed registers, each associated with a different one of said functions, each one of said distributed registers associated with and distributed among all of said adapters and having a single system address for all of said adapters associated with said distributed register to receive information in a single BIOS call relating to one ..of the functions of said I/O devices, each of said distributed registers being comprised of at least one bit of information from each adapter and said at least one bit of information being operative to control one of said functions of each I/O device associated with said each adapter;

calling a BIOS function resident in said BIOS means from a program executing in said system;

setting an address, under control of said BIOS means, into address selection means in each adapter to indicate to said respective adapter the address of any associated I/O device which is selected; and sending and receiving information, under control of said BIOS means, from a system bus to a distributed register in at least one adapter in a single BIOS call having a single system address, said distributed register being accessible to each I/O device from said single system address in said single BIOS call, and using said information to control the functions of each I/O device independently of other I/O devices in said single BIOS call.

9. A method, as in claim 8, including the further steps of:
selecting individual bus bit lines associated with a specific I/O address.

10. A method, as in claim 9, including the further steps of:
storing display contrast information in at least one of the distributed register bit locations.

11. A method, as in claim 9, including the further steps of:
storing display backlight control information in at least one of the distributed register bit locations.

12. A method, as in claim 9, including the further steps of:
storing display status information in at least one of the distributed register bit locations.

13. A method, as in claim 9, including the further steps of:
storing display command information in at least one of the distributed register bit locations.

14. A method, as in claim 9, including the further steps of:
storing display address information in at least one of the distributed register locations.

* * * * *